United States Patent
Kihara et al.

(10) Patent No.: US 8,605,328 B2
(45) Date of Patent: Dec. 10, 2013

(54) IMAGE PROCESSING SYSTEM AND IMAGE PROCESSING METHOD

(75) Inventors: Yuka Kihara, Kanagawa (JP); Tamon Sadasue, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 245 days.

(21) Appl. No.: 12/979,835

(22) Filed: Dec. 28, 2010

(65) Prior Publication Data
US 2011/0170122 A1 Jul. 14, 2011

(30) Foreign Application Priority Data
Jan. 8, 2010 (JP) .................... 2010-002825

(51) Int. Cl.
*G06F 15/00* (2006.01)
*G06K 1/00* (2006.01)

(52) U.S. Cl.
USPC .................................................. 358/1.9

(58) Field of Classification Search
None
See application file for complete search history.

(56) References Cited

U.S. PATENT DOCUMENTS

| | | | | |
|---|---|---|---|---|
| 5,032,904 | A * | 7/1991 | Murai et al. | 358/500 |
| 6,473,196 | B2 * | 10/2002 | Usami et al. | 358/1.18 |
| 6,909,803 | B2 * | 6/2005 | Uchida | 382/165 |
| 2007/0146732 | A1 * | 6/2007 | Piazza et al. | 358/1.1 |
| 2008/0304700 | A1 | 12/2008 | Kihara | |
| 2010/0067736 | A1 | 3/2010 | Kihara | |

FOREIGN PATENT DOCUMENTS

| | | |
|---|---|---|
| JP | 2001-14479 | 1/2001 |
| JP | 3430592 | 5/2003 |
| JP | 2007-242021 | 9/2007 |
| JP | 4232625 | 12/2008 |
| JP | 4284547 | 4/2009 |

OTHER PUBLICATIONS

E.G. Coffman, Jr. et al, "Performance Bounds for Level-Oriented Two-Dimensional Packing Algorithms," Society for Industrial and Applied Mathematics J., Comput., vol. 9, No. 4, Nov. 4, 1980, pp. 808-826.

* cited by examiner

*Primary Examiner* — Marivelisse Santiago Cordero
*Assistant Examiner* — John Wallace
(74) *Attorney, Agent, or Firm* — Oblon, Spivak, McClelland, Maier & Neustadt, L.L.P.

(57) ABSTRACT

An image processing system includes an information processing apparatus and an image forming apparatus that are connected via a network. The information processing apparatus receives inputs designating scan setting and a layout method, and transmits the scan setting and the layout method to the image forming apparatus. The image forming apparatus reads an original document according to the scan setting, outputs image data, extracts a content from the image data according to the layout method, and transmits the content to the information processing apparatus. The information processing apparatus determines, according to the layout method, a layout of the content on a page, arranges the content on the page according to the layout, and generates the drawing data. The image forming apparatus forms an image on a sheet of paper corresponding to the page according to drawing data.

16 Claims, 14 Drawing Sheets

| APPLICATION ID | scan001 |
|---|---|
| USER ID | userA |
| COOPERATION IDENTIFIER | scan |
| ADDRESS INFORMATION | http://xxx/yyy/zzz |
| DISPLAY NAME | SCAN APPLICATION |
| SCAN SETTING INFORMATION | ... |
| LAYOUT MODE INFORMATION | COLOR/MONOCHROME |

IMAGE PROCESSING SYSTEM AND IMAGE PROCESSING METHOD

CROSS-REFERENCE TO RELATED APPLICATIONS

The present application claims priority to and incorporates by reference the entire contents of Japanese Patent Application No. 2010-002825 filed in Japan on Jan. 8, 2010.

BACKGROUND OF THE INVENTION

1. Field of the Invention

The present invention relates to an image processing system and an image processing method in which an image forming apparatus is connected with an information processing apparatus via a network.

2. Description of the Related Art

In recent years, multifunction peripherals in each of which a scanner function and a printer function are implemented inside one housing, an image is read using the scanner function, and the read image is formed on a sheet of paper using the printer function has wide spread. A system in which the multifunctional peripheral is connected with a computer via a network, and setting for reading by the scanner function or setting for printing by the printer function in the multifunction peripheral is performed using the computer is being developed.

In this system, a technique of determining a layout of image data (contents), which is read from an original document by the scanner function of the multifunction peripheral, on a sheet of paper through the computer connected with the multifunction peripheral via the network has been proposed.

That is, the image data obtained by reading an image through the scanner function in the multifunction peripheral is transmitted to the computer via the network, and the layout on a sheet of paper is determined at the computer side by using a layout technique. As an algorithm for arranging a plurality of contents having different sizes on a sheet of paper (a page), for example, a first-fit decreasing-height (FFDH) disclosed in E. G. Coffman, JR., M. R. Garey, D. S. Johonson, R. E. Tarjan (Bell Lab. & Stanford Univ.) "Performance bounds for level-oriented two-dimensional packing algorithms," SIAM J. Comput., vol. 9, pp 808-826, No. 4, 1980, may be used. The computer generates drawing data using, for example, a page description language (PDL) according to the determined layout and transmits the drawing data to the multifunction peripheral via the network. The multifunction peripheral performs image formation based on the received drawing data.

In the conventional system described above, the image data obtained by reading the original document through the scanner function of the multifunction peripheral is transmitted, and the process of extracting contents from the received image data or the process of determining the layout of the extracted contents is performed at the compute side. That is, the computer deals with the image data whose size corresponds to the size of the original document and whose resolution is the read resolution that is set by the scanner function. Therefore, there is a problem in that a load of the computer side increases.

SUMMARY OF THE INVENTION

It is an object of the present invention to at least partially solve the problems in the conventional technology.

According to an aspect of the present invention, there is provided an image processing system that includes an information processing apparatus and an image forming apparatus that are connected via a network. The information processing apparatus includes an input unit that receives inputs designating scan setting and a layout method; a setting information transmitting unit that transmits the scan setting and the layout method that are designated through the input unit to the image forming apparatus; a layout determining unit; and a drawing data generating unit. The image forming apparatus includes a scan unit that reads an original document according to the scan setting transmitted from the setting information transmitting unit and outputs image data; a content extracting unit that extracts a content from the image data according to the layout method transmitted from the setting information transmitting unit; a content transmitting unit that transmits the content extracted from the image data to the information processing apparatus; and an image forming unit. The layout determining unit determines, according to the layout method, a layout of the content transmitted from the content transmitting unit on a page. The drawing data generating unit arranges the content on the page according to the layout and generates the drawing data. The image forming unit forms an image on a sheet of paper corresponding to the page according to drawing data.

According to another aspect of the present invention, there is provide an image processing method performed in an image processing system. The system included an information processing apparatus and an image forming apparatus that are connected via a network. The image processing method includes receiving, by the information processing apparatus, inputs designating scan setting and a layout method; transmitting, by the information processing apparatus, the scan setting and the layout method that are designated in the receiving to the image forming apparatus; reading, by the image forming apparatus, an original document according to the scan setting transmitted from the information processing apparatus and outputting image data; extracting, by the image forming apparatus, a content from the image data according to the layout method transmitted from the information processing apparatus; transmitting, by the image forming apparatus, the content extracted from the image data to the information processing apparatus; determining, by the information processing apparatus, according to the layout method, a layout of the content transmitted from the image forming apparatus on a page; arranging, by the information processing apparatus, the content on the page according to the layout and generating drawing data; and forming, by the image forming apparatus, an image on a sheet of paper corresponding to the page according to the drawing data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
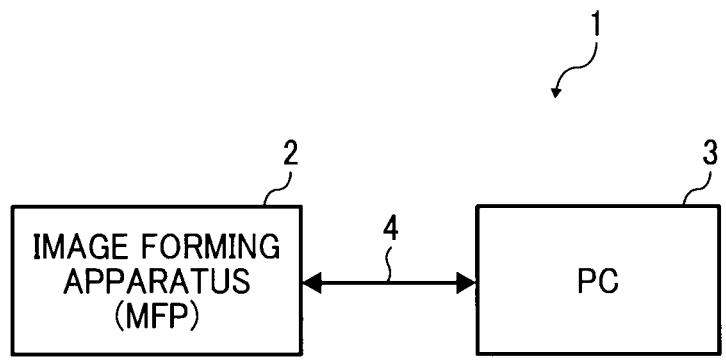
FIG. 1 is a schematic diagram schematically illustrating an image processing system according to a first embodiment of the present invention.

Hereinafter, a first embodiment of an image processing system according to the present invention will be explained with reference to the accompanying drawings. FIG. 1 schematically illustrates an image processing system 1 according to the first embodiment of the present invention. Schematically, in the image processing system 1, an image forming apparatus 2 is connected with a computer (PC) 3 that is an information processing apparatus via a network 4. The image forming apparatus 2 is, for example, a multifunction printer (MFP) and includes a scanner unit for reading an original document and outputting image data and a printer unit for performing printing according to drawing data and forming an image on a sheet of paper. As the computer 3, a typical computer including a central processing unit (CPU), a hard disk, and a communication interface (I/F) may be used.

The image forming apparatus 2 performs predetermined image processing on image data obtained by reading the original document and transmit the image data to the computer 3 via the network 4. Meanwhile, the computer 3 transmits setting information of the image forming apparatus 2 that is input through operation by a user to the image forming apparatus 2 via the network 4. The computer 3 determines a layout of the image data, which is transmitted from the image forming apparatus 2, on the sheet of paper and generates drawing data by using a PDL according to the determined layout.

The drawing data is transmitted to the image forming apparatus 2 via the network 4. The image forming apparatus 2 performs the printing process according to the received drawing data and forms an image on the sheet of paper based on the drawing data.

Figure 2:
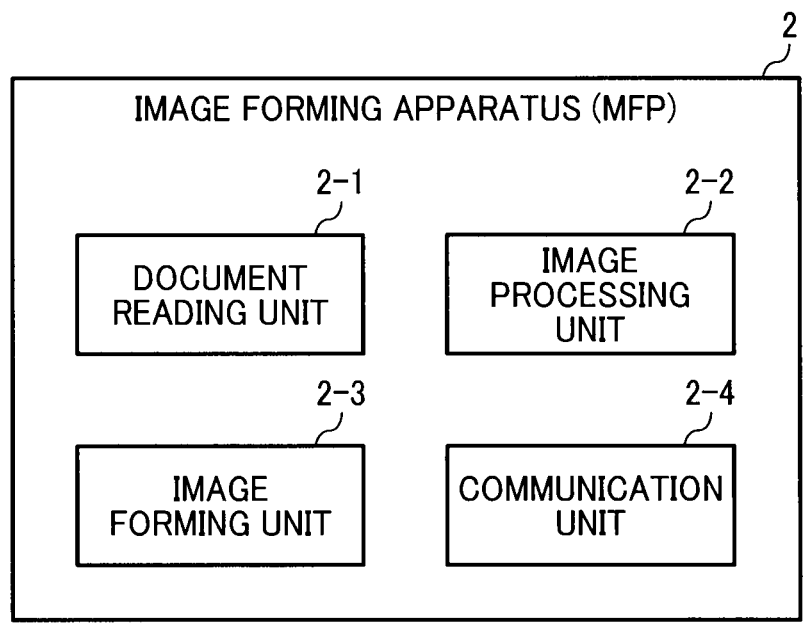
FIG. 2 is a block diagram illustrating exemplary functions of an image forming apparatus according to the first embodiment.

FIG. 2 is a block diagram illustrating exemplary functions of the image forming apparatus 2 according to the first embodiment. The image forming apparatus 2 includes a document reading unit 2-1, an image processing unit 2-2, an image forming unit 2-3, and a communication unit 2-4. The document reading unit 2-1 reads the original document through the scanner unit and outputs the image data.

The image processing unit 2-2 performs predetermined image processing on the image data output from the document reading unit 2-1. For example, the image processing unit 2-2 extracts contents from the image data according to a designated condition and outputs the contents. The image forming unit 2-3 performs the printing process according to the drawing data and forms an image on the sheet of paper based on the drawing data. The communication unit 2-4 controls communications to be performed via the network 4. Control of the document reading unit 2-1, the image forming unit 2-3, and the communication unit 2-4 and image processing in the image processing unit 2-2 are implemented, for example, by a program executed on a CPU (not shown) included in the image forming apparatus 2.

The condition to be designated to the image processing unit 2-2 when performing content extraction may include a color mode and a kind of the content of the image data. The color mode represents whether the content is a monochromatic image or a color image. The kind represents whether the content is a text or a picture (a photograph, an artwork, or a painting). If the kind of the content is a picture, a further condition is designated. That is, it is designated whether an object of the picture is a person or not (that is, whether the object of the picture is a landscape).

Figure 3:
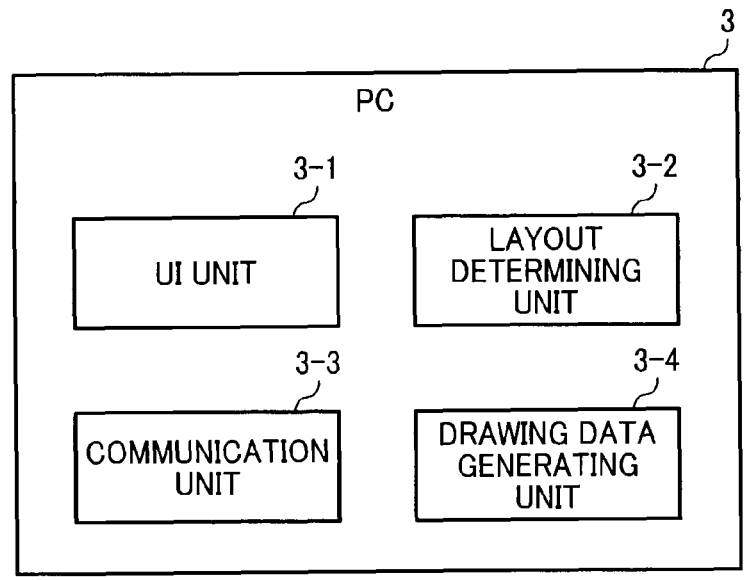
FIG. 3 is a block diagram illustrating exemplary functions of a computer according to the first embodiment.
Figure 4:
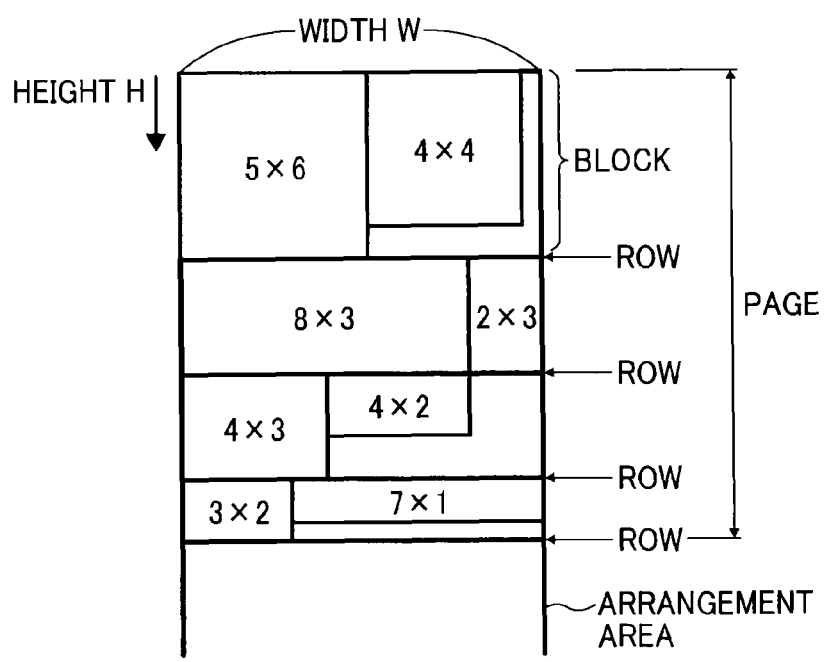
FIG. 4 is a schematic diagram for explaining a block and a row.

FIG. 3 is a block diagram illustrating exemplary functions of the computer 3 according to the first embodiment. The computer 3 is an information processing apparatus that includes a user interface (UI) unit 3-1, a layout determining unit 3-2, a communication unit 3-3, and a drawing data generating unit 3-4. The UI unit 3-1 is in charge of providing information to the user and receiving information from the user. For example, the UI unit 3-1 displays a screen for suggesting and receiving information on a display unit (not shown) under the control of the CPU according to the program. The UI unit 3-1 receives information input through operation by the user through an input device (not shown) such as a keyboard or a mouse.

The layout determining unit 3-2 arranges the content on the page corresponding to the printing area of the sheet of paper on which printing is to be performed by the image forming apparatus 2 and determines the layout. The communication unit 3-3 controls communications to be performed via the network 4. The drawing data generating unit 3-4 generates the drawing data for image formation for each of the pages by using a PDL according to the layout of the content determined by the layout determining unit 3-2.

An example of a content layout determining method to be executed by the layout determining unit 3-2 according to the first embodiment will be explained with reference to FIGS. 4 to 7.

The layout determining unit 3-2 generates a layout in which a plurality of rectangular contents having various sizes (width×height) is arranged on an arrangement area having the width W and the height H. The width W and the height H have finite values, respectively, and correspond to an area (a page) to be displayed at a time. For example, when an output image is formed on the sheet of paper, the page corresponds to a printable range in the sheet of paper. An area in which the width is equal to the width of the arrangement area, the height and the position in the height direction in the arrangement area are specified by upper and lower ends of image data having the highest height among image data which are neighboring each other in a horizontal direction and of which upper sides are aligned with each other is referred to as "block," and a separator line between the blocks is referred to as "row" (see FIG. 4).

The layout determining unit 3-2 arranges a plurality of contents on the page to satisfy the following conditions:
(1) the contents have the rectangular shape, and the width and the height are rational numerical values;
(2) rotation of the content is not allowed, and
(3) the contents are not superimposed on each other.

Figure 5:
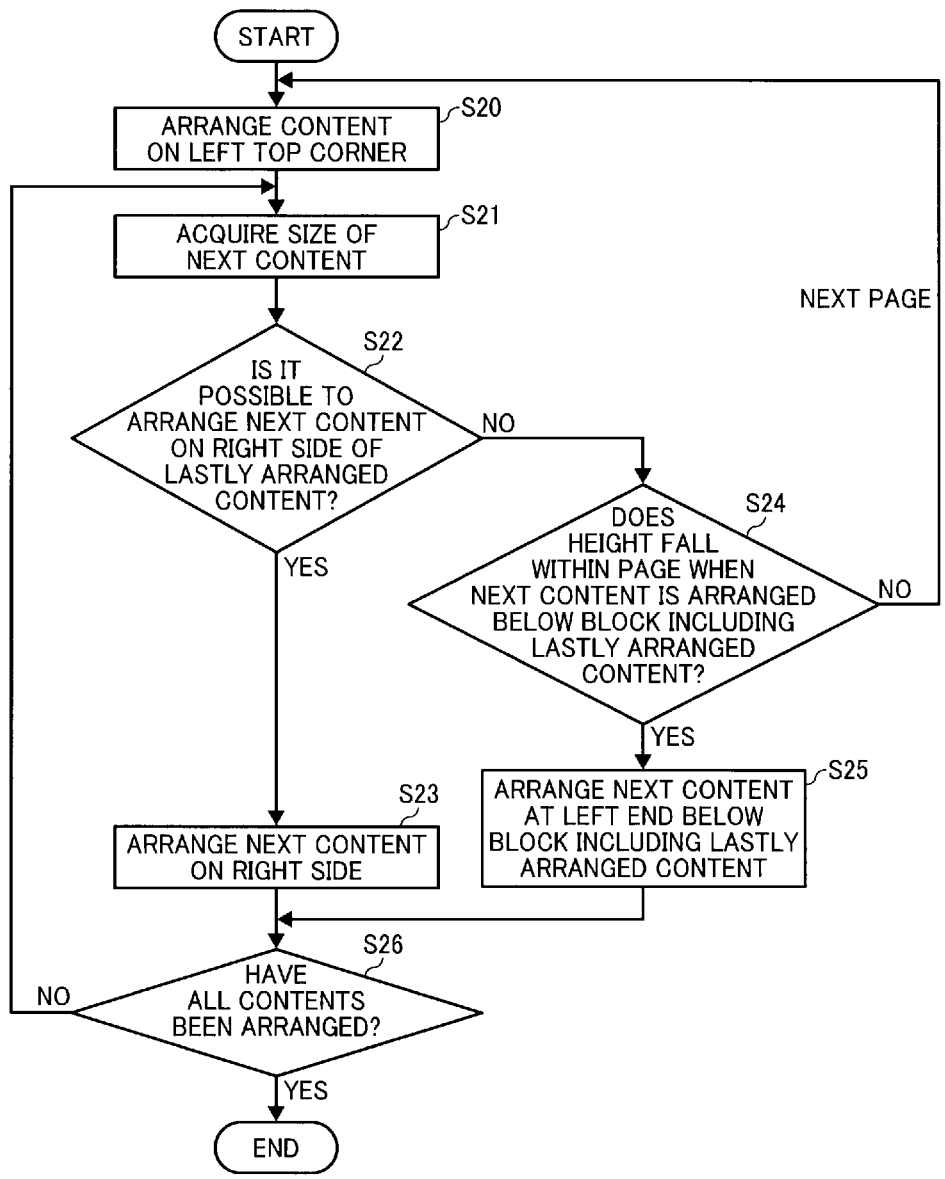
FIG. 5 is an exemplary flowchart for explaining a next-fit algorithm.

According to the first embodiment, the layout of the contents on each page is determined to satisfy the conditions (1) to (3) by using a next-fit algorithm. FIG. 5 is an exemplary flowchart illustrating the next-fit algorithm. Each process in the flowchart of FIG. 5 is executed in the layout determining unit 3-2.

First, in step S20, among image data that are not arranged yet, a content to be arranged next is arranged on a left top corner of an m-th page. For example, the contents are arranged in order of transmission from the image forming apparatus 2. The present invention is not limited thereto, and the contents may be arranged in numerical order of numbers allocated to the contents, respectively transmitted from the image forming apparatus 2.

Next, in step S21, the size (width×height) of an image of the content n to be newly arranged is acquired. In step S22, it is determined whether or not the image of the content n can be arranged on the right side of the image of a lastly arranged content n−1, on the basis of the size of the image of the content n acquired in step S21 and the sizes of the images of the already arranged contents. Hereinafter, "image of the content" is referred to as simply "content" unless set forth otherwise therein.

In step S22, it is determined whether it is possible to arrange the image of the content n on the right side of the image of the content n−1 with respect to the width and the height of the content n. That is, if a space between the right side of the lastly arranged content n−1 and the right end of the page is narrower than the width of the content n or if the lower side of the content n is beyond the lower end of the page when the upper side of the lastly arranged content n−1 coincide with the upper side of the content n, it is determined that the content n cannot be arranged on the right side of the lastly arranged content n−1.

If it is determined in step S22 that the image of the content n can be arranged on the right side of the lastly arranged content n−1, the process proceeds to step S23. In step S23, the image of the content n is arranged on the right side of the lastly arranged content n−1.

If it is determined in step S22 that the image of the content n cannot be arranged on the right side of the lastly arranged content n−1, the process proceeds to step S24. In step S24, when it is assumed that the content n is arranged directly below the block including the lastly arranged content n−1, it is determined whether or not the content n can fall within the page. If it is determined that the content n does not fall within the page, that is, that the lower side of the content n is beyond the lower end of the page, the process returns to step S20, and the content n is arranged at the left top corner of the next page.

If it is determined in step S24 that the content n falls within the page, the process proceeds to step S25. The content n is arranged on the left end of the page directly below the block including the lastly arranged content n−1.

Figure 6:
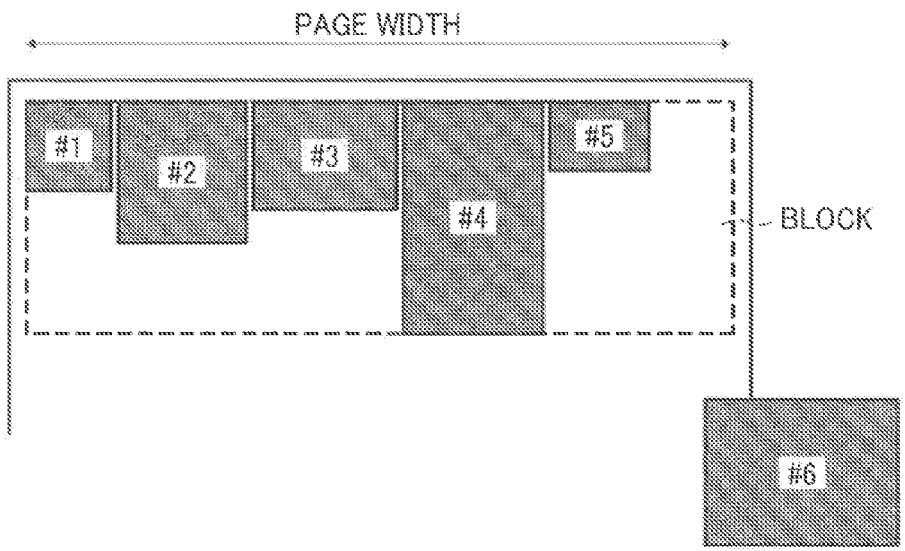
FIG. 6 is an exemplary flowchart for explaining a next-fit algorithm.

A further detailed description will be made with reference to FIGS. 6 and 7. There will be considered an example in which a content #6 will be arranged in a state in which contents #1 to #5 are already arranged within a block as illustrated in FIG. 6. In this case, in step S21, the size of the image of the content #6 is acquired. In step S22, it is determined whether or not the content #6 can be arranged on the right side of the lastly arranged content #5. In the example of FIG. 6, because the width of the image of the content #6 to be newly arranged is larger than the length between the right side of the image based on the lastly arranged content #5 and the right end of the page, it is determined that the content #6 cannot be arranged.

Since it is determined that the content #6 cannot be arranged on the right side of the content #5, the process proceeds to step S24. Then, if the content #6 is to be arranged directly below the block including the lastly arranged content #5, it is determined whether or not the image of the content #6 falls within the page in the height direction. In the example of FIG. 6, since the image of the content #6 falls within the page in the height direction, the process proceeds to step S25. In step S25, as illustrated in FIG. 7, the content #6 is arranged on the left side directly below the block including the content #5.

When the content n is arranged in step S23 or step S25, the process proceeds to step S26, and it is determined whether or not all contents that should be arranged have been completely arranged. If it is determined that they have been completely arranged, a series of processes in the flowchart of FIG. 5 ends. However, if it is determined that there is some contents that have not yet completed, that is, there are contents that have not yet arranged, the process returns to step S21, and the same process is performed on the next content.

In the above described process, when the size of the content to be arranged next is acquired in step S21, if the width or the height of the content exceeds the size of the page, the content cannot be arranged within the page. In this case, for example, the size of the content may be reduced to fall within the page.

Figure 8:
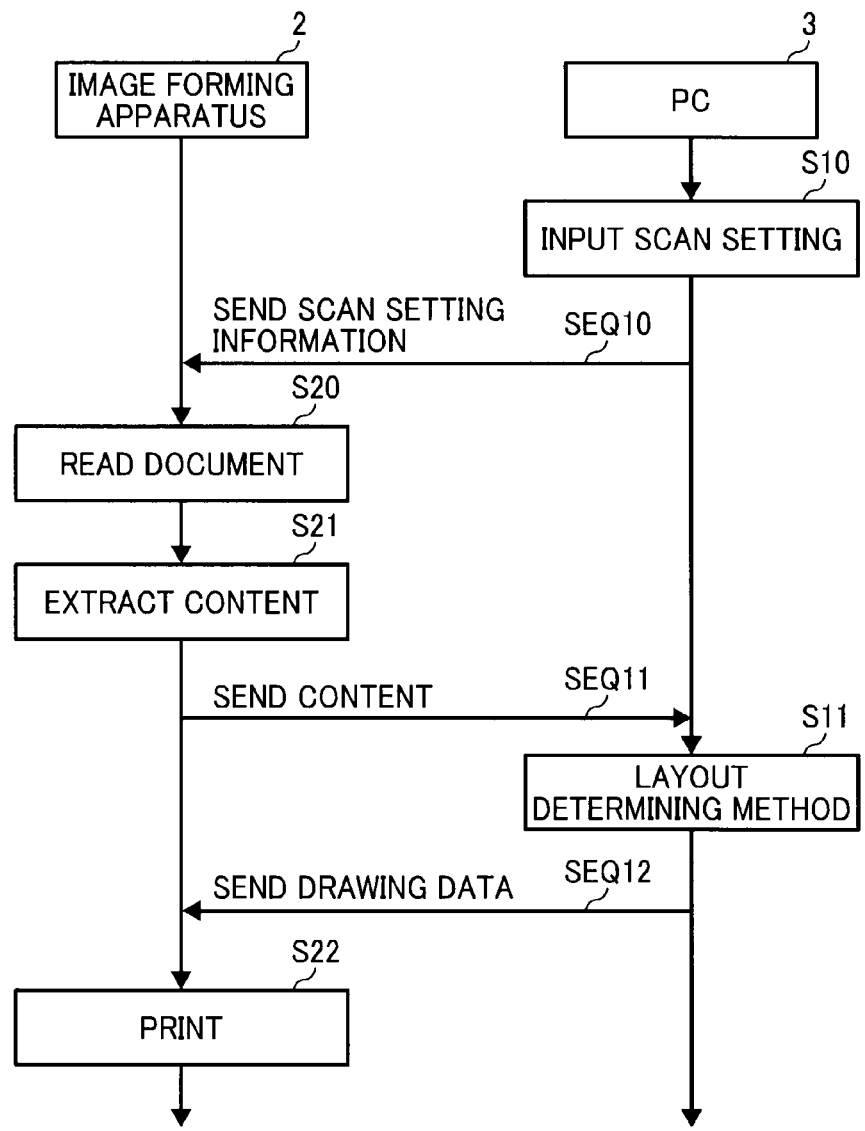
FIG. 8 is an exemplary sequence diagram illustrating an image processing method according to the first embodiment.

Next, an image processing method according to the first embodiment will be explained in further detail. FIG. 8 is an exemplary sequence diagram illustrating the image processing method according to the first embodiment. The image forming apparatus 2 includes an auto document feeder (ADF), which enables a plurality of documents to be read continuously, as a mechanism of the document reading unit 2-1. It is assumed that before executing the sequence illustrated in FIG. 8, a plurality of documents is set in the ADF in advance.

First, in the computer 3, setting for the scan process to be executed by the image forming apparatus 2 is input to the UI unit 3-1 through the operation by the user. For example, information necessary for the scan operation such as a scan resolution or a color mode (color or monochrome) is input as scan setting.

In step S10, an input for designating a layout method of the contents on the page is performed together with scan setting.

As a condition for determining the layout, for example, the following two kinds may be considered:

a first layout method: a characteristic of a content image is used as a condition; and a second layout method: information of an original document that is a source of image data from which the content is extracted is used as a condition.

According to the first layout method, the layout is determined such that the contents having the same image characteristic are arranged on the same page. Examples of the characteristic of the content image may include a color mode and a kind of the content. The color mode represents whether the content is the monochromatic image or the color image. The kind represents a kind of the content image, and particularly, represents whether the content image is a text or a picture.

According to the second layout method, the layout is determined such that the contents are arranged on the page based on the information of the original document that is a source of the image data from which the content is extracted. An example of the original document information may include information representing a reading order of the original document when a plurality of sheets of original document is continuously scanned. In this case, the layout is determined such that the contents extracted from the image data obtained by reading the original document are arranged in the reading order of the original document. Another example of the document information may include information representing the original document that is a source of the image data from which the content is extracted. In this case, for example, when the contents extracted from the image data obtained by reading the document are to be arranged on the page, the layout is determined such that the contents extracted from the image data of the same original document are arranged on the same page.

Only one of the four layout methods based on the first and second layout methods may be selected and designated, or a combination of two or more methods may be designated.

After a variety of information is input in step S10, in step SEQ10, scan setting information, which includes information representing scan setting that is input and designated in step S10 and information representing the layout method are transmitted from the computer 3 to the image forming apparatus 2 via the network 4.

After the scan setting information is received by the image forming apparatus 2, the document reading unit 2-1 in the image forming apparatus 2 starts a document reading process according to the information representing scan setting included in the scan setting information. The document reading process may start automatically when the scan setting information is received or start when the user operates the image forming apparatus 2.

After document reading is performed in step S20, in step S21, the image processing unit 2-2 extracts the contents from the image data obtained by document reading. Extraction of the contents is performed according to the condition expressed in the information representing the layout method included in the scan setting information transmitted from the computer 3 in step SEQ10 described above. At the same time, attribute information representing an attribute of the extracted contents is output in association with the content. The attribute information conforms to the condition expressed in the information representing the layout method included in the scan setting information.

For example, if it is designated that the layout is determined according to the first layout method and the color mode, the content of the monochromatic image and the content of the color image are extracted from the image data. At this time, a monochromatic image area and a color image area may be extracted from the image data by using an existing auto color select technique. In the auto color select process, for example, whether the image data is the monochromatic image or the color image is determined by whether or not values of red (R), green (G), and blue (B) of the image data coincide.

If it is designated that the layout is determined according to the first layout method and the color mode, the attribute information representing whether the extracted content is the monochromatic image or the color image is associated with the content.

If it is designated that the layout is determined according to the first layout method and the kind, the text contents and the picture contents are extracted from the image data. At this time, a text area and a picture area may be extracted from the image data by using an existing image area separation technique. In the image area separation technique, for example, a line image area of the image data is recognized, and the text area and the image area in the image data are extracted based on a ratio of the line image area in the image data.

If it is designated that the layout is determined according to the first layout method and the kind, the attribute information representing whether the extracted content is the text or the picture is associated with the content.

If the second layout method is designated, and it is designated that the layout is determined according to the reading order, the information representing the scan order of the original document that is a content extraction source is associated with the content extracted from the image data as attribute information. At this time, the content may be extracted from the image data obtained by reading the document in step S20 by using the auto color select process or the image area separation process described above.

If the second layout method is designated and information representing the original document that is a source of the image data from which content is extracted is used as the document information, information specifying the original document that is the content extraction source is associated with the content extracted from the image data as the attribute information. As described above, the content may be extracted from the image data obtained by reading the document in step S20 by using the auto color select process or the image area separation process described above.

After the content extraction process in step S21 is completed, in step SEQ11, the extracted contents and the attribute information associated with the contents are transmitted from the image forming apparatus 2 to the computer 3 via the network 4. At this time, the image forming apparatus 2 transmits only image data of the content area extracted from the image data obtained by reading one document to the computer 3.

The content extraction process in step S21 may be performed at each time of performing the reading process on one document in step S20 or may be performed after performing the reading process on a plurality of documents in step S20. The process of transmitting the content and the attribute information in step SEQ11 may be sequentially performed at each time when the content is extracted or at each time when content extraction from one image data is completed. Further, when the reading process is performed on a plurality of documents in step S20, the content and the attribute information may be transmitted after content extraction from all image data obtained by reading the plurality of documents is completed.

Figure 7:
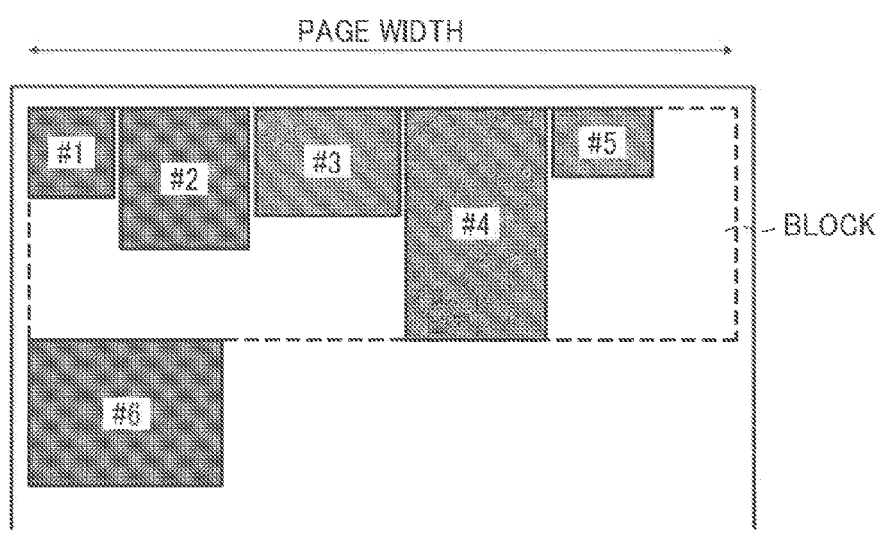
FIG. 7 is an exemplary flowchart for explaining a next-fit algorithm.

After the content and the attribute information are received by the computer 3, the layout determining unit 3-2 in the computer 3 arranges the contents on the page and determines the layout by using the next-fit algorithm described in FIGS. 5 to 7 according to the layout method designated in step S10 and the received attribute information (step S11). A specific example of the layout determining method will be explained later.

After the layout of the contents is determined by the layout determining unit 3-2 in step S11, the drawing data generating unit 3-4 acquires layout information representing the determined layout from the layout determining unit 3-2. The drawing data generating unit 3-4 generates drawing data using the PDL based on the acquired layout information. In step SEQ12, the generated drawing data is transmitted from the computer 3 to the image forming apparatus 2 via the network 4.

After the drawing data is received by the image forming apparatus 2, in step S22, the image forming unit 2-3 in the image forming apparatus 2 performs the printing process based on the received drawing data and forms an image on the sheet of paper according to the drawing data.

Figure 9:
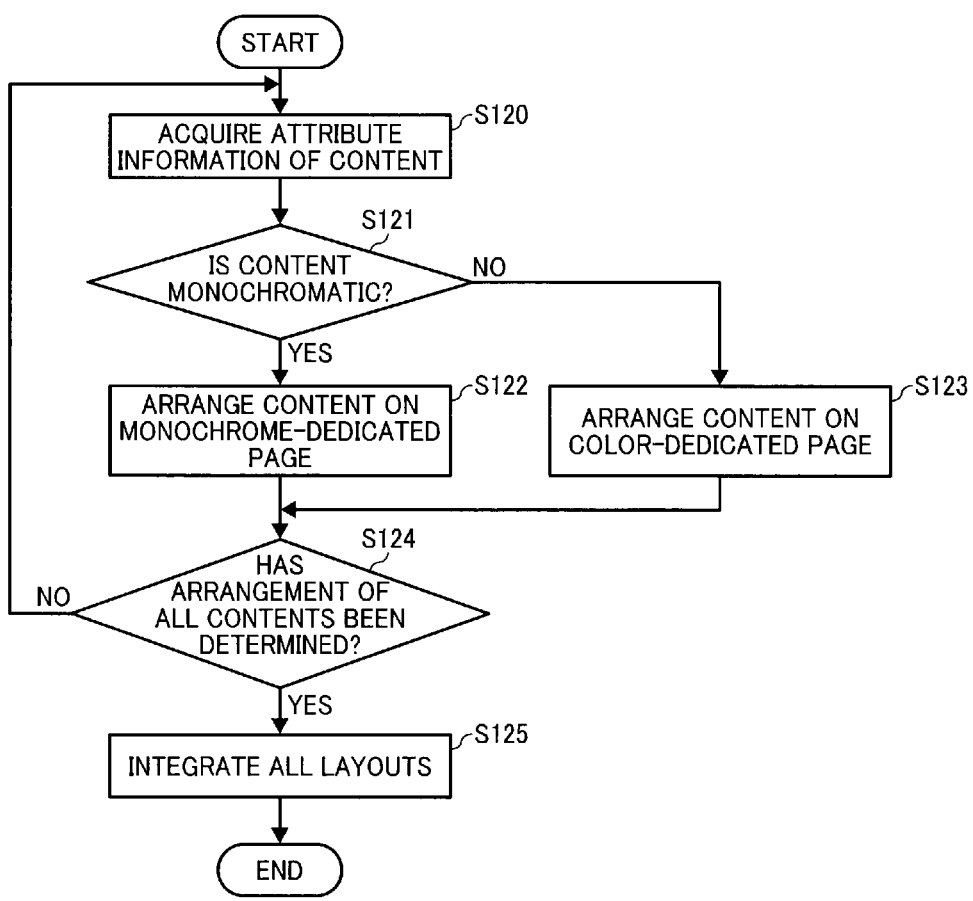
FIG. 9 is a flowchart illustrating an example of a layout determining method when content extraction is performed according to a first layout method.

An example of the layout determining method in step S11 will be explained. FIG. 9 is a flowchart illustrating an example of a layout determining method when it is designated in step S10 that content extraction is performed according to the first layout method. In the example of FIG. 9, the color mode is also designated as the first layout method. In this case, the attribute information represents whether the corresponding content is the monochromatic image or the color image. Here, it is assumed that the contents are sequentially transmitted at each time when the content is extracted.

First, in step S120, the layout determining unit 3-2 acquires the attribute information of the content to be on the layout. In step S121, the layout determining unit 3-2 determines whether the content to be on the layout is the monochromatic image or the color image by using the acquired attribute information. If it is determined that the content is the monochromatic image, the process proceeds to step S122, and the content is arranged on a monochrome-dedicated page. However, if it is determined that the content is the color image, the process proceeds to step S123, and the content is arranged on a color-dedicated page.

In step S124, it is determined whether or not the process was completed on all of the contents. For example, when content transmission is sequentially performed at each time when the content is extracted or performed for each image data, the image forming apparatus 2 may transmit a notification representing that content extraction on all documents is completed to the computer 3.

If it is determined in step S124 that the process was not completed on all contents, the process returns to step S120. If it is determined that the process was completed on all contents, the process proceeds to step S125, and the layout determining unit 3-2 integrates the monochrome-dedicated page with the color-dedicated page to determine the layout.

As described above, by separately arranging the contents of the monochromatic images and the contents of the color images on different pages, the image forming apparatus 2 can perform monochromatic printing on the page on which the contents of the monochromatic images are arranged. Therefore, it is possible to prevent image quality degradation occurring in the case of printing the page in which the content of the monochromatic image is mixed with the content of on the color image. Further, the number of color-printed sheets is reduced, so that the color toner can be saved.

Further, even when it is designated in step S10 that content extraction is performed according to the first layout method and the kind, the layout can be determined in a similar manner to the process illustrated in the flowchart of FIG. 9. In this case, in the description of the flowchart of FIG. 9, the monochromatic image and the color image are replaced with the text and the picture, respectively.

Further, when the second layout method is designated and it is designated that the layout is determined according to the reading order of the document, the layout can be determined so that the contents with the same scan order can be continuously arranged. In this case, if the scan order of the content to be newly arranged is different from that of the lastly arranged content, the process is forcibly shifted to step S24 in the flowchart of FIG. 5, and the content to be newly arranged may be arranged directly below the block including the lastly arranged content or at the left top corner of the next page.

Further, when the second layout method is designated and the information representing the document that is a source of the image data from which the content is extracted is used as the document information, the layout is determined based on the attribute information so that the contents extracted from the image data obtained by reading the same document can be arranged on the same page. If all of the contents do not fall within one page, some of the contents may be arranged on the next page, or the images of the contents may be reduced to fall within one page. Further, the contents extracted from the image data obtained by reading a plurality of documents may be arranged within one page. In this case, similarly to the second layout method described above, the layout is preferably determined so that the contents obtained by reading the same document can be continuously arranged.

Figure 10:
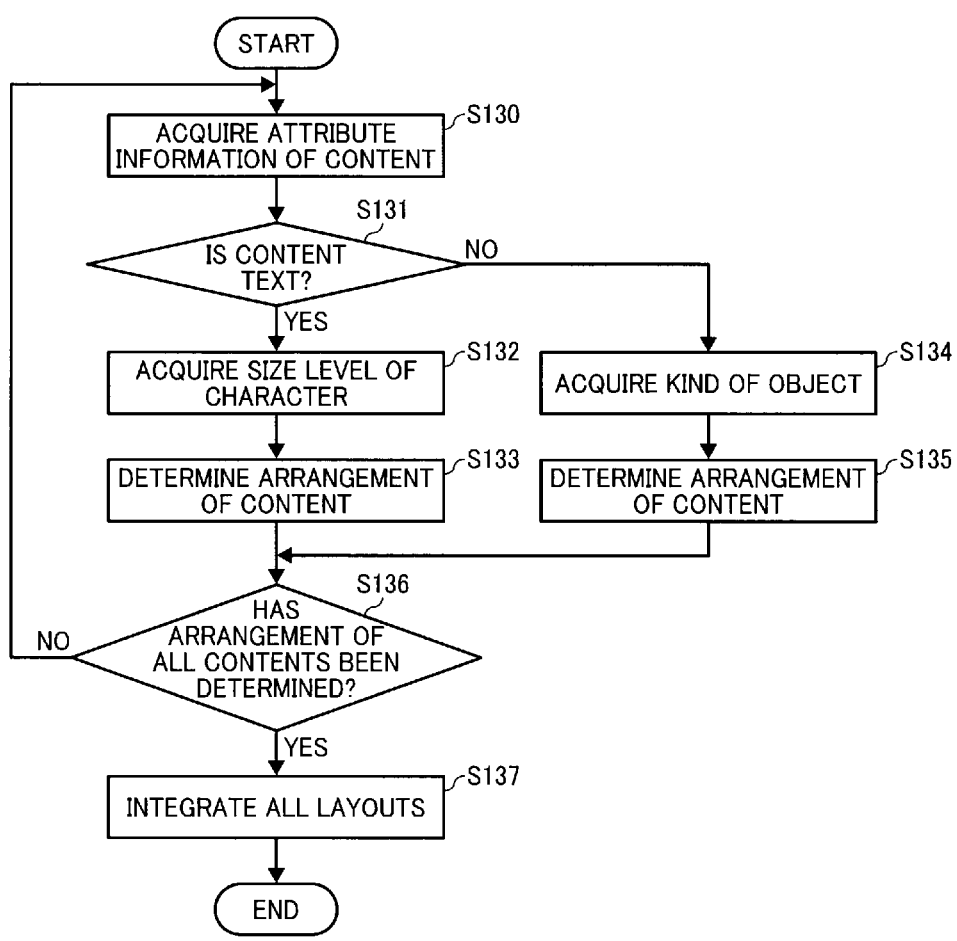
FIG. 10 is a flowchart illustrating an example of a layout determining method in which a plurality of layout methods is combined.

FIG. 10 is a flowchart illustrating an example of a layout determining method in which a plurality of layout methods is combined. In the example of FIG. 10, the first and second layout methods are combined, and a size level of a character is added as a condition. For example, the size level of the character may be detected when the text content is extracted in the content extraction process in step S21. The size level of the character may be included in the attribute information as the information representing the size level of the character.

First, in step S130, the layout determining unit 3-2 acquires the attribute information of the content to be on the layout. Next, in step S131, the layout determining unit 3-2 determines whether the content to be on the layout is the text or the picture by using the acquired attribute information. If it is determined that the content is the text, the process proceeds to step S132, and the layout determining unit 3-2 acquires information representing the size level of the character as the attribute information. In step S133, the layout determining unit 3-2 arranges the content on the text-dedicated page, for each of the size level of the character, according to information the size level of the character. Then, the process proceeds to step S136.

However, if it is determined in step S131 that the content is the picture, the process proceeds to step S134, and the layout determining unit 3-2 acquires an image kind (monochromatic image/color image) of the content based on the attribute information. In step S135, the layout determining unit 3-2 arranges the content on the dedicated page prepared for each kind of objects. Then, the process proceeds to step S136.

In step S136, it is determined whether or not the process was completed on all of the contents. If it is determined as not completed, the process returns to step S130. However, if it is determined that the process was completed on all of the contents, the process proceeds to step S137, and the layout determining unit 3-2 integrates the layouts of the dedicated pages to generate layout information.

Even when a plurality of layout methods are combined as described above, the layout can be determined by appropriately arranging the contents. In the above description, a plurality of methods in the first layout method is combined, but the present invention is not limited thereto. Even when either or both of the two methods in the second layout method are combined with the first layout method, the layout of the contents can be appropriately determined in a similar manner.

Preferably, the computer 3 displays a preview screen showing a course of content arranging process to be performed by the UI unit 3-1 or an edit screen for instructing arrangement of the contents on the sheet of paper on a display unit (not shown) and supports the user to designate the content or check the layout.

Figure 11:
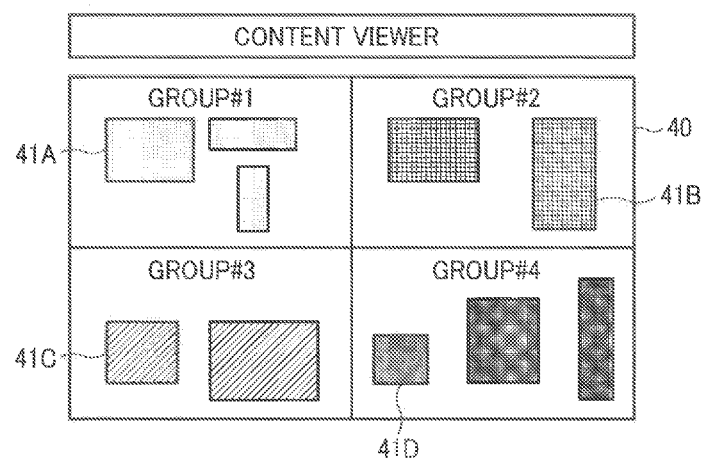
FIG. 11 is a schematic diagram illustrating an example of a content viewer that is a graphical user interface (GUI) for displaying contents.

FIG. 11 illustrates an example of a graphical user interface (GUI) content viewer 40 for displaying the contents. The UI unit 3-1 acquires the attribute information or the image data of each of the contents among the layout from the layout determining unit 3-2 and displays the content viewer 40 or a content viewer 42, which will be described later, on the display unit (not shown). The content viewer 40 illustrated in FIG. 11 is an example in which images 41A, 41B, 41C, and 41D of the contents acquired by reading images from the document are grouped into each attribute according to the attribute information and displayed.

Figure 12:
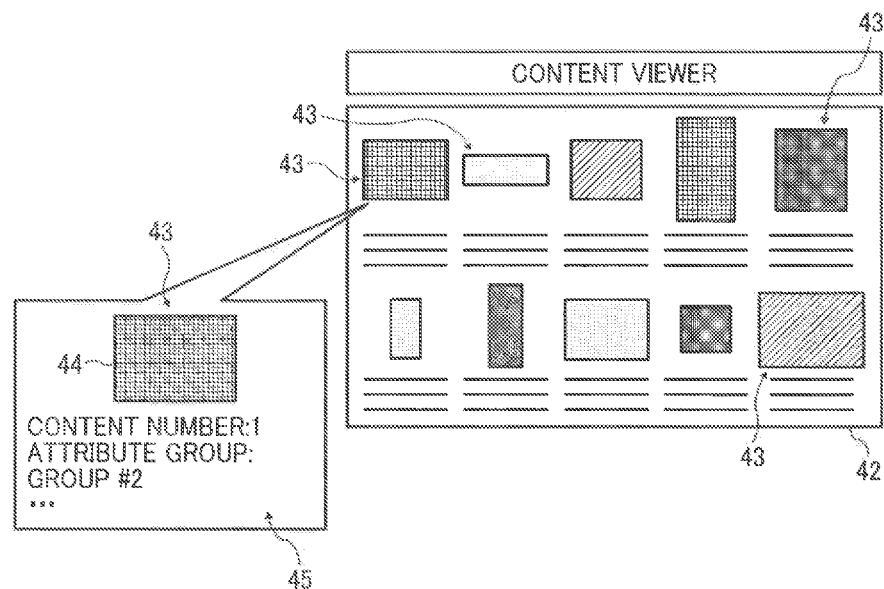
FIG. 12 is a schematic diagram illustrating another example of a content viewer.

FIG. 12 illustrates another example of the content viewer. The content viewer 42 illustrated in FIG. 12 displays content information 43 that are lined up in a content reception order. The content information 43 is displayed together with attribute information 45 corresponding to the content.

As illustrated in FIGS. 11 and 12, the content is displayed in association with attribute information 46 that is an index for selecting a content 44. This helps the user select necessary contents.

For example, the contents can be grouped into the text contents and the picture contents and displayed. Similarly, the contents can be grouped into the contents of the monochromatic image and the contents of color image and displayed. Thus, the user can quickly find the necessary contents from among the contents generated from the image obtained by reading the original document.

As described above, according to the first embodiment, the conditions for extracting the contents from the image data obtained by reading the document are set at the computer 3 side and transmitted to the image forming apparatus 2 as the scan setting information. The image forming apparatus 2 extracts the contents from the image data obtained by reading the document according to the received scan setting information. Thus, the computer 3 does not need to perform the process of extracting the contents from the image data, so that the load according to the layout generating and determining process is alleviated.

Further, since only the contents extracted from the image data are transmitted from the image forming apparatus 2 to the computer 3, the traffic of the network 4 is alleviated.

Second Embodiment

Next, a second embodiment of the present invention will be explained. The second embodiment relates to an example in which an operation of the image processing system 1 according to the first embodiment is implemented by using an application managed in an application management server connected to the network.

Figure 13:
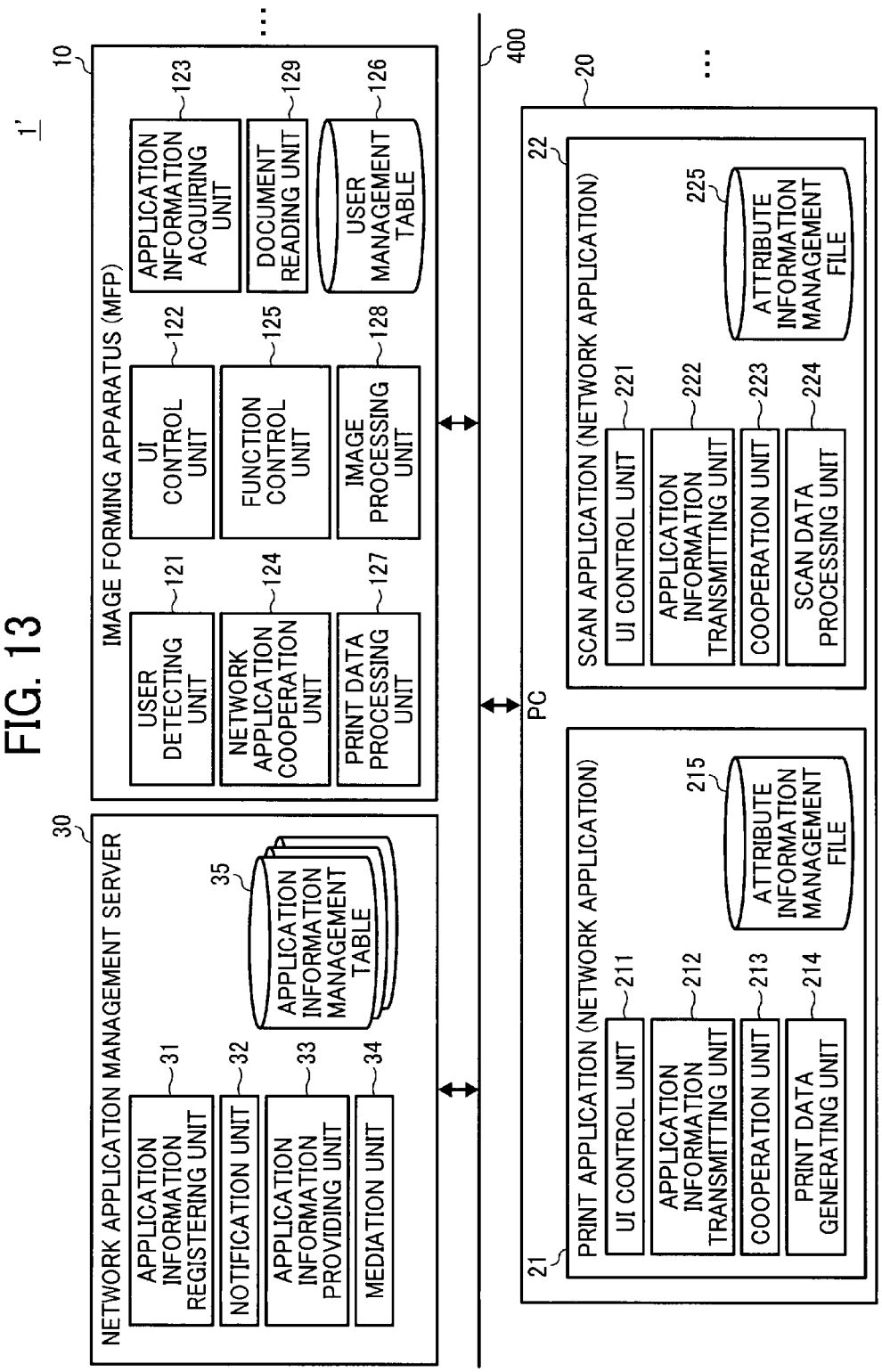
FIG. 13 is a block diagram illustrating exemplary functions of an image processing system according to a second embodiment.

FIG. 13 is a block diagram illustrating exemplary functions of an image processing system 1' according to the second embodiment. In FIG. 13, one or more image forming apparatus 10, one or more computer 20, and a network application management server 30 are connected via a network 400 such as a local area network (LAN). As the network 400, a wired or a wireless network may be used.

The computer 20 is, for example, a personal computer (PC) assigned to each user and includes the functions of the computer 3 of FIG. 1. The computer 20 has an application (hereinafter, referred to as "network application") for cooperating with the image forming apparatus 10 and providing a predetermined service. In the example of FIG. 13, as an example of the network application, a print application 21 and a scan application 22 are provided.

The print application 21 is a network application for executing a print job in the image forming apparatus 10 that communicates therewith via the network 400. The print application 21 includes a UI control unit 211, an application information transmitting unit 212, a cooperation unit 213, a print data generating unit 214, and an attribute information management file 215.

The UI control unit 211 displays a variety of display screens related to the print application 21 on the display unit of the computer 20. The application information transmitting unit 212 transmits a registration request of application information related to the print application 21 to the network application management server 30 according to operation by a user. Information necessary for execution of the print application 21 is included in the application information.

The print data generating unit 214 generates the drawing data for printing in the image forming apparatus 10 by using a printer driver installed in the computer 20. The cooperation unit 213 controls exchange of information for cooperation with the image forming apparatus 10. The attribute information management file 215 stores therein attribute information of the print application 21. The attribute information stored in the attribute information management file 215 includes, for example, an identifier (an application ID) of the print application 21, a user ID of a user that is a holder of the print application 21, and an initial value of print setting information (information representing a printing condition).

The scan application 22 is a network application for executing predetermined processing such as transmission or storage of image data obtained by reading the original document in the image forming apparatus 10. The scan application 22 includes a UI control unit 221, an application information transmitting unit 222, a cooperation unit 223, a scan data processing unit 224, and an attribute information management file 225. The above described functions of the computer 3 according to the first embodiment may correspond to the functions of the scan application 22.

The UI control unit 221 displays a variety display screens related to the scan application 22 on the display unit of the computer 20. The application information transmitting unit 222 transmits a registration request of application information of the scan application 22 to the network application management server 30 when the scan application 22 starts. The application information of the scan application 22 includes the scan setting information and a printing request for the image forming apparatus 10.

The scan data processing unit 224 includes the functions of the layout determining unit 3-2 and the drawing data generating unit 3-4 described above. As the function of the drawing data generating unit 3-4, the function of the print data generating unit 214 in the print application 21 described above may be used. The scan data processing unit 224 executes predetermined processing such as transmission or storage on the image data that is scanned in the image forming apparatus 10 and transmitted to the computer 20. When the content extracted from the image data obtained by reading the original document in the image forming apparatus 10 according to the scan setting information transmitted from the computer 20 is received, the scan data processing unit 224 determines the layout of the content according to the designated layout method.

The cooperation unit 223 controls communications (e.g., exchange of information) for cooperation with the image forming apparatus 10. The attribute information management file 225 stores setting information on the scan application 22. The attribute information management file 225 stores attribute information of the scan application 22. The attribute information stored in the attribute information management file 225 includes, for example, an identifier (an application ID) of the scan application 22, a user ID of a user who is a holder of the scan application 22, and an initial value of scan setting information.

As can be seen from that the user IDs of the user of the network applications are recorded in the attribute information management file 215 of the print application 21 and the attribute information management file 225 of the scan application 22, respectively, the network applications belong to the users. Thus, when the same network applications are different according to the user to which each network application belongs, the network applications are distinguished as being different.

For example, a network application belonging to a user A can be basically allowed to be used only by the user A. Similarly, a network application belonging to a user B can be basically allowed to be used only by the user B. For example, however, another user may be allowed to use the network application belonging to any other user by giving a use right to another user through an access control function.

FIG. 13 illustrates that only one computer 20 is connected to the network 400, but two or more computers 20 may be connected with the network 400. Each of the computers 20 may have a different network application function.

The network application management server 30 is a computer that includes an application information registering unit 31, a notification unit 32, an application information providing unit 33, and a mediation unit 34. The application information registering unit 31 receives a registration request of the application information transmitted from the computer 20 and stores the received application information in an application information management table 35. The application information management table 35 is generated, for each of the users, in a storage apparatus of the network application management server 30. That is, the application information management table 35 manages the application information of the network application belonging to the corresponding user.

The notification unit 32 notifies the image forming apparatus 10 of the user ID included in the application information received by the application information registering unit 31 via the network in a broadcasting or multicasting manner. The notification is performed in units of users, that is, in units of user IDs. Specifically, after the notification with respect to the use A is performed, even if the new application information belonging to the user A is received, notification on the application information is not performed. That is, the notification unit 32 notifies the image forming apparatus 10 that a user who can use a certain network application is newly generated. The present invention is not limited thereto, but notification may be performed in units of application information. In this case, double notification may be issued to the same user, but double notification can be excluded at the image forming apparatus 10.

The application information providing unit 33 transmits the application information registered in the application information management table 35 to the image forming apparatus 10 upon a request from the image forming apparatus 10. The mediation unit 34 mediates exchange of information between the network application and the image forming apparatus 10.

Any one of the computers 20 connected to the network may function as the network application management server 30. That is, the application information registering unit 31, the notification unit 32, the application information providing unit 33, and the mediation unit 34 may be implemented in any one of the plurality of computers 20.

The image forming apparatus 10 is a multifunctional peripheral configured to implement at least the print function and the scan (image reading) function within one housing. The present invention is not limited thereto, but the image forming apparatus 10 may further include a copy function or a facsimile function. The image forming apparatus 10 includes a user detecting unit 121, a UI control unit 122, an application information acquiring unit 123, a network application cooperation unit 124, a function control unit 125, a user management table 126, a print data processing unit 127, an image processing unit 128, and a document reading unit 129.

The user detecting unit detects the presence of the user who can use the network application based on the notification issued from the network application management server 30 and registers the user ID included in the notification to the user management table 126. The user management table 126 is a table for managing a list of users in which an available network application is present on the network 400.

The UI control unit 122 receives a user input such as an operation instruction of the network application. That is, the network application is installed in the computer but can be operated through an operation panel of the image forming apparatus 10.

The application information acquiring unit 123 acquires the application information of the network application, which belongs to a user selected from among users registered to the user management table 126, from the network application management server 30. The network application cooperation unit 124 controls exchange of information with the network application. The function control unit 125 controls execution of a function requested from the network application. For example, printing or scanning is executed under control of the function control unit 125.

The print data processing unit 127 generates a print image on the sheet of paper based on the drawing data. The document reading unit 129 corresponds to the document reading unit 2-1 described above. The document reading unit 129 reads the original document through the scanner and output the image data. The image processing unit 128 corresponds to the image processing unit 2-2 described above. The image processing unit 128 extracts the content from the image data output from the document reading unit 129 based on the scan setting information received via the network 400 and outputs the attribute information corresponding to the extracted content.

Figure 14:
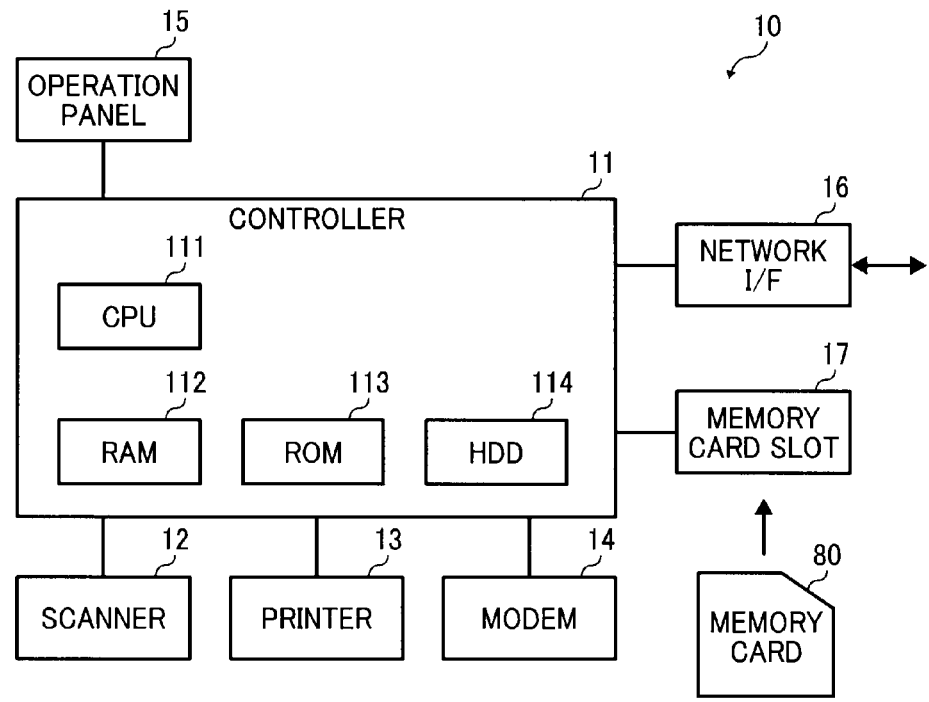
FIG. 14 is a block diagram schematically illustrating an exemplary structure of an image forming apparatus according to the second embodiment.

FIG. 14 schematically illustrates an exemplary structure of the image forming apparatus 10 according to the second embodiment. Referring to FIG. 14, the image forming apparatus 10 includes a controller 11, a scanner 12, a printer 13, a modem 14, an operation panel 15, a network interface (I/F) 16, and a memory card slot 17.

The controller 11 includes a CPU 111, a random access memory (RAM) 112, a read only memory (ROM), and a hard disk drive (HDD) 114. A variety of programs or data used by the programs are stored in the ROM 113 and the HDD 114 in advance. The CPU 111 uses the RAM 112 as the work memory and controls an operation of the image forming apparatus 10 by executing a program read out from the ROM 113 and the HDD 114.

The scanner 12 reads the original document and outputs the image data. The printer 13 performs the printing process according to the drawing data and forms an image on the sheet of paper based on the drawing data. The modem 14 is connected to a telephone line to perform data communication and used for executing transmission and reception of image data through facsimile communication. The operation panel 15 includes an input device for receiving operation by a user and a display unit such as a liquid crystal panel. The display unit may be a touch panel configured integrally with the input device.

The network I/F 16 controls communication to be performed via the network such as a LAN. The memory card slot 17 is used to read data or a program stored in a memory card 80 including a semiconductor memory. That is, the image forming apparatus 10 can read and execute a program stored in the memory card as well as the program previously stored in a ROM 113 or the HDD 114.

Figure 15:
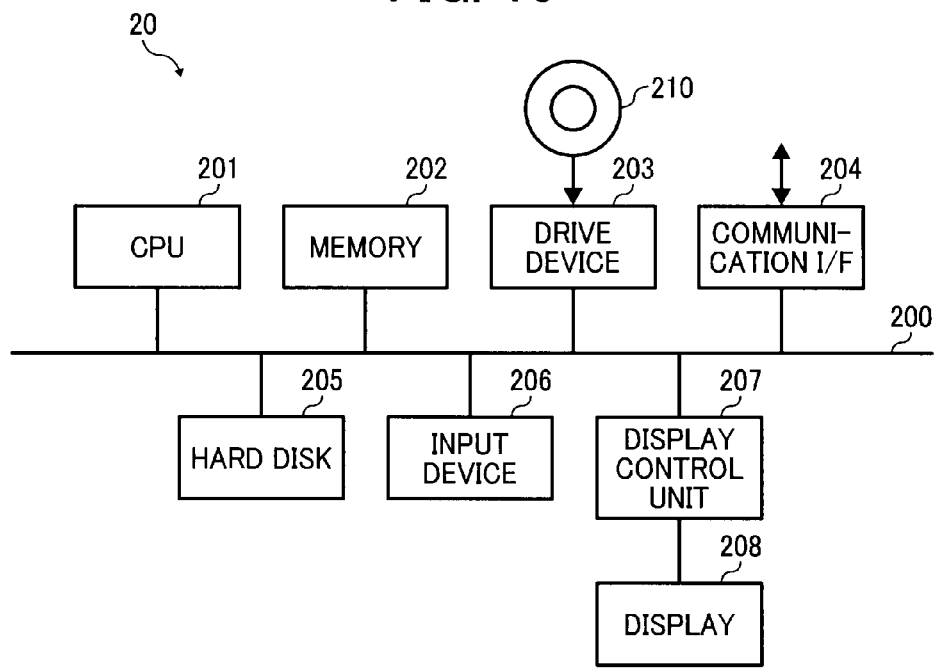
FIG. 15 is a block diagram illustrating an exemplary structure of a computer.

FIG. 15 illustrates an exemplary structure of the computer 20. A CPU 201, a memory 202, a drive device 203, and a communication I/F 204 are connected to a bus 200. Further, a hard disk 205, an input device 206, and a display control unit 207 are connected to the bus 200. The components connected to the bus can communicate with each other via the bus 200.

A program for operating the CPU 201 or a variety of data is previously stored in the hard disk 205. The CPU 201 uses the memory 202 as a work memory and executes the program read from the hard disk 205. The functions of the layout determining unit 3-2, the drawing data generating unit 3-4, the UI unit 3-1, and the communication unit 3-3 may be implemented by executing the program on the CPU 201.

A recording medium 210 is removably loaded into the drive device 203, and the drive device 203 reads data from the recording medium 210. The recording medium 210 that can be supported by the drive device 203 may include a disk recording medium such as a compact disc (CD) or a digital versatile disk (DVD) and a rewritable non-volatile semiconductor memory (e.g., EEPROM).

The communication I/F 204 controls communications to be performed via the network 400. The input device 206 includes a pointing device such as a mouse and a keyboard and receives operation by a user. The input device 206 outputs a control signal according to operation by a user and transmits the control signal to the CPU 201.

The display control unit 207 is connected to a display 208 used as a display device such as a liquid crystal display (LCD). The display control unit 207 converts a display control signal generated by the CPU 201 according to a program into a signal that can be displayed through the display 208 and transmits the signal to the display 208. A GUI for operating each of applications installed in the computer 20 can be constituted by display in the display 208 and the input device 206.

The program to be stored in the hard disk 205 may be provided in a form recorded in the recording medium 210. The program is installed in the computer 20 by reading out the program recorded in the recording medium 210 through the drive device 203 and storing the hard disk 205. The present invention is not limited thereto, but the program to be stored in the hard disk 205 may be acquired via the network 400.

In the image processing system 1', the application information set in the computer 20 is stored in the network application management server 30 in association with the user ID. The image forming apparatus 10 can acquire the application information corresponding to the user ID from the network application management server 30. Therefore, the user can have the result of an operation as set by the user thanks to the setting that is to be executed in the image forming apparatus 10 without registering the network application to the image forming apparatus 10.

Next, an execution procedure of the network application according to the second embodiment will be explained with reference to FIGS. 16 to 21. First, registration of the scan application 22 to the network application management server 30 will be explained. When the computer 20 is instructed to start the scan application 22 through operation by a user, a screen based on the scan application 22 is displayed on the display 208.

Figure 16:
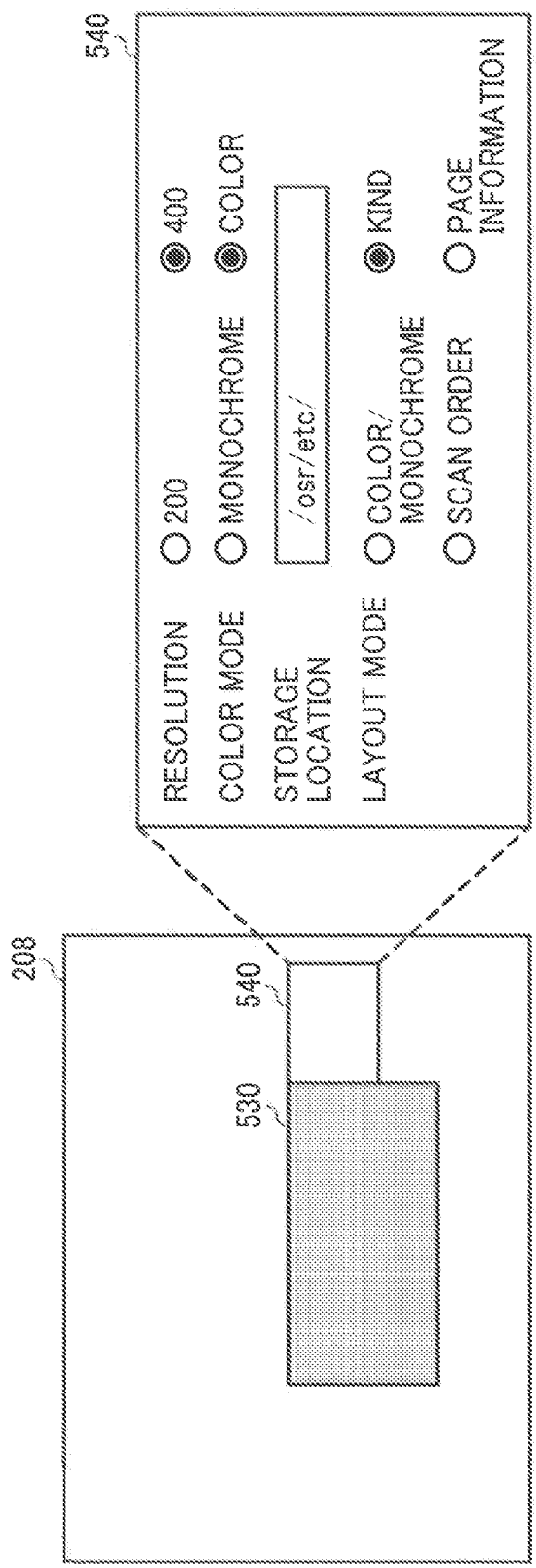
FIG. 16 is a schematic diagram illustrating a display example of a main screen of a scan application and an input screen of scan setting information.

FIG. 16 illustrates a display example of a main screen 530 of the scan application 22 and an input screen 540 of the scan setting information displayed on the display 208. A configuration of the main screen 530 is not a main feature of the second embodiment, and thus detailed illustration thereof will not be shown.

Referring to FIG. 16, the input screen 540 is displayed at the right side of the main screen 530. In this example, items for scan setting (a resolution, a color mode, and a storage location) and an item for designating a layout method (a layout mode) are displayed on the input screen 540.

As a storage location among the items for scan setting, the storage location of the computer 20 for storing the image data obtained by reading the original document through the image forming apparatus 10 or contents extracted from the image data are to be stored, is input. The layout mode as the item for designating the layout method may be designated with one of the four methods based on the first and second layout methods described above or a combination thereof.

When the values of the setting items are set in the input screen 540, the UI control unit 221 stores the set information, for example, in the memory 202 or the hard disk as the scan setting information.

The initial values displayed in the respective items of the input screen 540 are acquired from the attribute information management file 225. That is, the scan setting information that the user desires are previously included in the attribute information management file 225. Thus, the input screen 540 does not need to be necessarily displayed. If the input screen 540 is not displayed, the scan setting information acquired from the attribute information management file 225 may be loaded into the memory 202.

If an input of the scan setting information is completed, the application information transmitting unit 222 transmits the registration request of the application information of the scan application 22 to the network application management server 30.

Figures 17, 18:
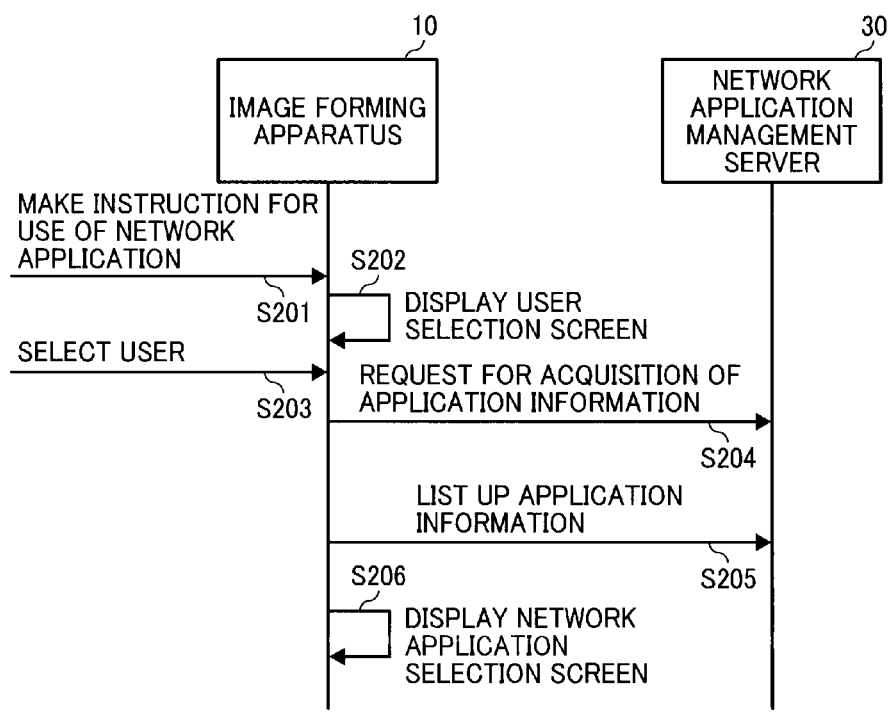
FIG. 17 is a schematic diagram illustrating an example of application information of a scan application.
FIG. 18 is a sequence diagram for explaining a processing procedure of a process of displaying an available network application list to a user.

FIG. 17 illustrates an example of the application information of the scan application 22. Referring to FIG. 17, the application information of the scan application 22 includes an application ID, a user ID, a cooperation function identifier, address information, a display name, information for scan setting (described as scan setting information in FIG. 17), and layout mode information.

The application ID is identification information for uniquely identifying each of the network applications. The user ID is identification information for identifying a user having a use right of the scan application 22. The cooperation function identifier is an identifier for identifying a function required by the image forming apparatus s10 to cooperate with the scan application 22, that is, a function of the image forming apparatus 10 used by the scan application 22. In the case of the scan application 22, a value of the cooperation function identifier is, for example, "scan." The address information is a network address for uniquely identifying each of the network applications in communications to be performed via the network 400. A uniform resource locator (URL) may be used as the address information. The display name is a name of the scan application 22 displayed in the image forming apparatus 10.

The application ID, the user ID, the cooperation function identifier, the address information, and the display name are acquired from the attribute information management file 225.

The information for scan setting is information for scan setting set in the input screen 540 or information for scan setting acquired from the attribute information management file 225. The layout mode information is referred to as layout mode information set in the input 540.

The application information transmitted from the network application management server 30 is registered to the application information management table 35 corresponding to the user ID included in the application information through the application information registering unit 31 of the network application management server 30.

Unlike the scan application 22, the application information of the print application 21 is registered to the network application management server 30 in units of jobs other than units of applications.

After starting the scan application 22 in the computer 20, the user moves to the installation place of the image forming apparatus 10 in order to operate the scan application 22. In the case in which a plurality of image forming apparatuses 10 are connected to the network 400, the user detecting unit 121 of each of the image forming apparatuses 10 receives the same notification, and the user ID and an URL for application information acquisition are registered to the user management table 126 of each of the image forming apparatuses 10. Thus, the user can operate each of the network applications from any of the plurality of image forming apparatuses 10.

Next, a process executed in the image forming apparatus according to operation by a user will be explained. FIG. 18 is a sequence diagram for explaining a processing procedure of a process of displaying an available network application list to the user.

In step S201, an instruction for use of the network application is input by the user through the operation panel 15. In step S202, the UI control unit 122 of the image forming apparatus 10 displays the user selection screen on the operation panel 15 based on information registered to the user management table 126. Alternatively, in step S202, the UI control unit 122 may acquire user information from the network application management server 30 and display the user selection display based on the acquired user information.

In step S203, the user is selected from the user selection screen through operation by a user. The application information acquiring unit 123 acquires a URL for application information acquisition associated with the user ID of the selected user from the user management table 126. Further, when selecting the user through operation by the user, user authentication may be performed. In this case, only when the user is authorized, a subsequent process can be executed.

If the user is selected, in step S204, the application information acquiring unit 123 transmits an application information acquisition request to the URL for application information. The application information acquisition request is received by the application information providing unit 33 of the network application management server 30. In step S205, the application information providing unit 33 acquires the application information of all the network applications registered to the application information management table 35 corresponding to the URL for application information acquisition and transmits a list of the acquired application information to the image forming apparatus 10.

At the time of transmitting a list of the application information, the application information providing unit 33 generates a URL for relaying communication between the image forming apparatus 10 and each of the network applications uniquely for each of the network applications (that is, for each application information). The application information providing unit 33 adds the URL for relaying generated for each of the network applications to the application information corresponding to each of the network applications and transmits a list of the application information having the URL for relaying to the image forming apparatus 10.

The URL for relaying may be generated and added to the application information when the application information registering unit 31 registers the application information to the application information management table 35.

When the list of the application information is received by the image forming apparatus 10, the UI control unit 122 of the image forming apparatus 10 stores the received list of the application information in the RAM 112. In step S206, the network application selection screen including the list of the network applications that can be used by the user is displayed on the display unit of the operation panel 15 based on the stored list of the application information.

Figure 19:
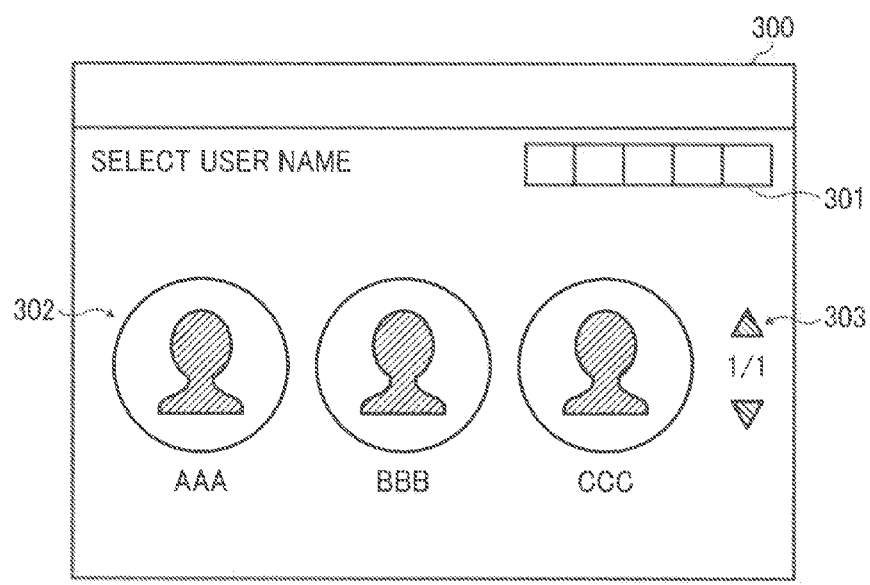
FIG. 19 is a schematic diagram illustrating an example of a user selection screen.

FIG. 19 illustrates an example of a user selection screen 300 displayed in step S202. The display unit of the operation panel 15 includes a so-called touch panel that outputs a signal according to a contact position.

An icon representing a user is displayed, for each user ID, on a user display unit 302 in the user selection screen 300. In the example of FIG. 19, users "AAA," "BBB," and "CCC" are displayed. By operating (touching) the icon by a finger, the user of the user ID corresponding to the operated icon is selected.

Further, by operating a button group 301 in the user selection screen 300, a user display method can be changed. If all of the registered users cannot be displayed on the user display unit 302 because a number of users are registered, by operating a button group 303, the page of the user display unit 302 can change, and other users can be sequentially displayed.

Figure 20:
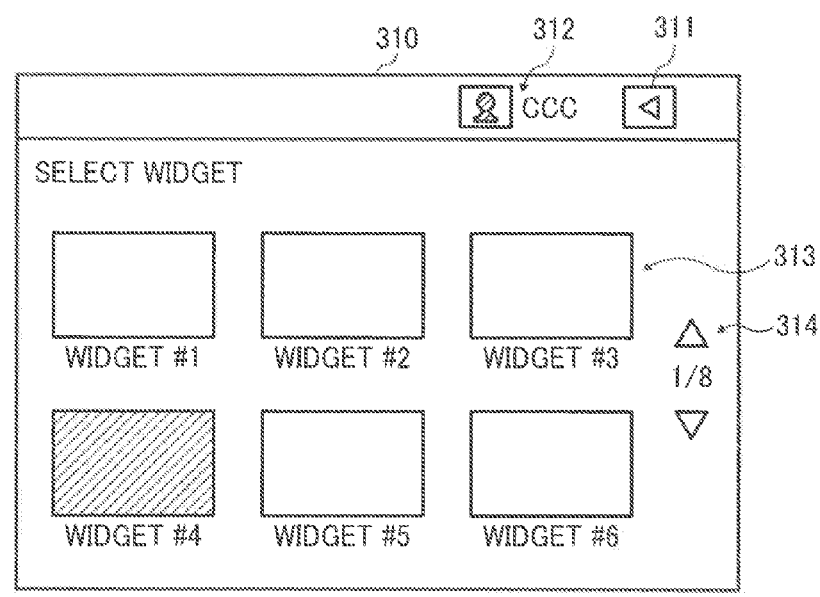
FIG. 20 is a schematic diagram illustrating an example of a network application selection screen.

FIG. 20 illustrates an example of a network application selection screen 310 displayed in step S206. The list of the network applications is displayed on a network application display unit 313 in the network application selection screen 310. Hereinafter, the network application is referred to as "widget," and the network application selection screen 310 is referred to as "widget selection screen 310." In the example of FIG. 20, six widgets #1 to #6 are displayed on one page of the selection screens 310. Even in this case, by operating a button group 314, the page of the widget selection screen 310 can change, and other widgets can be displayed.

As one of the widgets, the scan application 22 is included. Similarly, the print application 21 is also one of the widgets.

Further, in the widget selection screen 310, a user display unit 312 displays information (the user ID and the icon) representing the user that is selected right before in the user selection screen 300, that is, the user that caused the widget selection screen 310 to be displayed. By operating a button 311, it is possible to return to the user selection screen 300.

Figure 21:
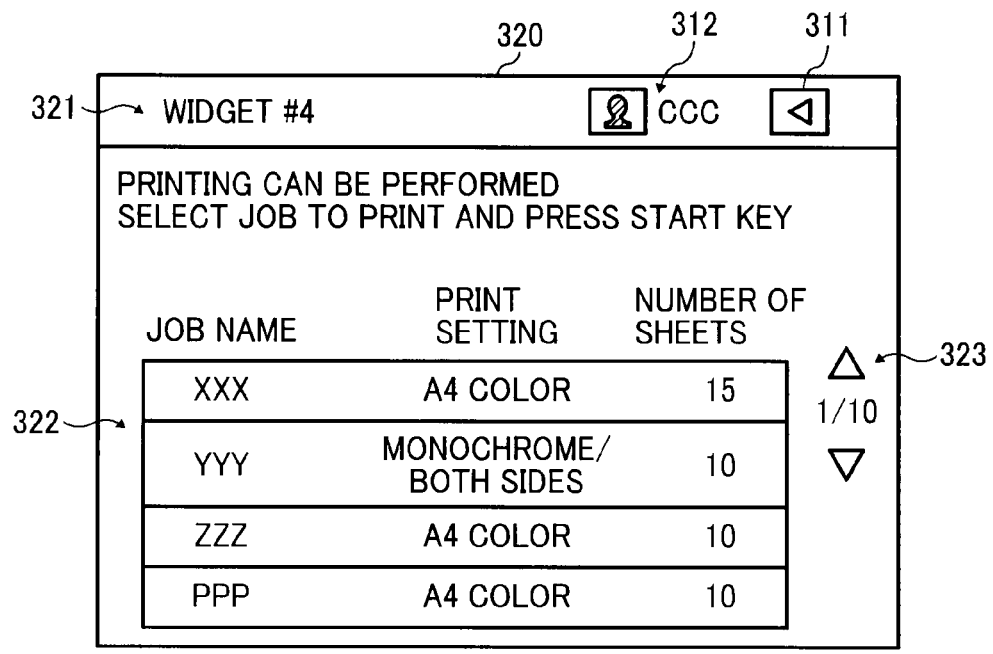
FIG. 21 is a schematic diagram illustrating an example of a widget execution screen.

When the desired widget is selected in the widget selection screen 310, a widget execution screen 320 illustrated in FIG. 21 is displayed. In this example, the widget #4 that is the print application 21 is selected. A widget display 321 displays a display name of the selected widget. Further, in this example in which the print application 21 is selected, a list of printable jobs is displayed on a main display unit 322 of the widget execution screen 320. In this case, by operating a button group 323, jobs to display can sequentially change. By selecting a desired job and operating an execution key that is a hard key (not shown), printing based on the selected job starts.

If the scan application 22 is selected in the widget selection screen 310 of FIG. 20, for example, a message urging original document setting is displayed on the widget execution screen 320 of FIG. 21. When the execution key is operated after setting the original document, reading of the document starts, and for example, a screen representing a document reading result is displayed on the widget execution screen 320.

The contents are extracted from the image data obtained by reading the original document by the image processing unit 128 according to the scan setting information, and the extracted contents are transmitted to the computer 20 via the network 400. The scan data processing unit 224 in the computer 20 displays the received contents according to the designated layout method to determine the layout. The drawing data is generated according to the determined layout.

The generated drawing data is transmitted to the image forming apparatus 10 via the network 400. The printing process is performed by the print data processing unit 127, so that an image is formed on a sheet of paper based on the drawing data.

According to the present invention, there is an effect in which a load of a computer side is alleviated when a layout determining process based on image data read by a multifunction peripheral is performed on a computer connected with the multifunction peripheral via a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising an information processing apparatus and an image forming apparatus that are connected via a network, wherein
    the information processing apparatus includes:
        an input unit that receives inputs designating scan setting and a layout method;
        a setting information transmitting unit that transmits the scan setting and the layout method that are designated through the input unit to the image forming apparatus;
        a layout determining unit; and
        a drawing data generating unit,
    the image forming apparatus includes:
        a scan unit that reads an original document according to the scan setting transmitted from the setting information transmitting unit and outputs image data;
        a content extracting unit that extracts contents from the image data according to the layout method transmitted from the setting information transmitting unit;
        a content transmitting unit that transmits the contents extracted from the image data to the information processing apparatus; and
        an image forming unit,
    the layout method is to determine an arrangement of the contents extracted from the image data on a page,
    the layout determining unit determines, according to the layout method, a layout of the contents transmitted from the content transmitting unit on the page,
    the layout defines an arrangement of the contents on the page,
    the drawing data generating unit arranges the contents on the page according to the layout and generates the drawing data,
    the image forming unit forms an image on a sheet of paper corresponding to the page according to drawing data,
    the contents are of various sizes and the arrangement of the contents on the page defines how the contents of various sizes are arranged in an arrangement area of the page, and
    the layout determining unit arranges the contents on the page to satisfy the following conditions by executing a fitting algorithm:
    the contents have a rectangular shape;
    rotation of the contents is not allowed; and
    superimposition of the contents is not allowed.

2. The image processing system according to claim 1, wherein the layout method is a method in which the layout of the contents on the page is determined according to an image characteristic of the content.

3. The image processing system according to claim 2, wherein the image characteristic represents whether an image of the contents is a monochromatic image or a color image.

4. The image processing system according to claim 2, wherein the image characteristic represents whether an image of the contents is a text or a picture.

5. The image processing system according to claim 1, wherein the layout method is a method in which the layout of the contents on the page is determined according to information of the original document that is a source of the image data from which the contents are extracted.

6. The image processing system according to claim 5, wherein the information of the original document represents a reading order of the original document by the scan unit.

7. The image processing system according to claim 5, wherein the information of the document represents the original document that is a source of the image data from which the contents are extracted.

8. An image processing method performed in an image processing system including an information processing apparatus and an image forming apparatus that are connected via a network, the image processing method comprising:
    receiving, by the information processing apparatus, inputs designating scan setting and a layout method;
    transmitting, by the information processing apparatus, the scan setting and the layout method that are designated in the receiving to the image forming apparatus;
    reading, by the image forming apparatus, an original document according to the scan setting transmitted from the information processing apparatus and outputting image data;
    extracting, by the image forming apparatus, contents from the image data according to the layout method transmitted from the information processing apparatus;
    transmitting, by the image forming apparatus, the contents extracted from the image data to the information processing apparatus;
    determining, by the information processing apparatus, according to the layout method, a layout of the contents transmitted from the image forming apparatus on a page;
    arranging, by the information processing apparatus, the contents on the page according to the layout and generating drawing data; and
    forming, by the image forming apparatus, an image on a sheet of paper corresponding to the page according to the drawing data, wherein the layout method is for determining an arrangement of the contents extracted from the image data on a page, and the layout defines an arrangement of the contents on the page, the contents are of various sizes and the arrangement of the contents on the page defines how the contents of various sizes are arranged in an arrangement area of the page, and the determining and arranging are performed such that the contents are arranged on the page so as to satisfy the following conditions by the image forming apparatus executing a fitting algorithm:

the contents have a rectangular shape;

rotation of the contents is not allowed; and superimposition of the contents is not allowed.

9. The image processing system according to claim 1, wherein the content transmitting unit attributes information, which represents an attribute of the extracted contents and is based on the layout method, along with the extracted contents to the information processing apparatus, and the layout determining unit determines, according to the layout method and the received attribute information, the layout of the contents transmitted from the content transmitting unit on the page.

10. The image processing method according to claim 8, further comprising:

attributing information, which represents an attribute of the extracted content and is based on the layout method, along with the extracted contents to the image forming apparatus; and determining, according to the layout method and the received attribute information, the layout of the contents on the page.

11. The image processing method according to claim 8, wherein the layout method is a method in which the layout of the contents on the page is determined according to an image characteristic of the contents.

12. The image processing method according to claim 11, wherein the image characteristic represents whether an image of the contents is a monochromatic image or a color image.

13. The image processing method according to claim 11, wherein the image characteristic represents whether an image of the contents is a text or a picture.

14. The image processing method according to claim 8, wherein the layout method is a method in which the layout of the contents on the page is determined according to information of the original document that is a source of the image data from which the contents are extracted.

15. The image processing method according to claim 14, wherein the information of the document represents a reading order of the document.

16. The image processing method according to claim 14, wherein the information of the document represents the original document that is a source of the image data from which the contents are extracted.

* * * * *